United States Patent [19]
Bivens

[11] Patent Number: 5,870,945
[45] Date of Patent: *Feb. 16, 1999

[54] PORTABLE FILTRATION AND TREATMENT APPARATUS

[76] Inventor: Thomas H. Bivens, 6907 FM 1488, Magnolia, Tex. 77355-1250

[ * ] Notice: The term of this patent shall not extend beyond the expiration date of Pat. No. 5,731,024.

[21] Appl. No.: 902,012

[22] Filed: Jul. 29, 1997

Related U.S. Application Data

[63] Continuation-in-part of Ser. No. 784,371, Jan. 17, 1997, Pat. No. 5,731,024.

[51] Int. Cl.$^6$ .............................. A47J 37/00; A47J 37/12; C11B 5/00
[52] U.S. Cl. .............................. 99/408; 99/403; 210/167; 210/DIG. 8
[58] Field of Search .................... 99/330, 403, 407–410; 210/167, 461, 486, 489, DIG. 8; 126/351, 374, 391; 236/26 A; 134/111, 166 R; 426/417, 438

[56] References Cited

U.S. PATENT DOCUMENTS

| Re. 34,636 | 6/1994 | Bivens . |
| 445,223 | 1/1891 | Knight . |
| 2,359,368 | 10/1944 | Klopfenstein . |
| 2,424,211 | 7/1947 | Webb . |
| 2,610,740 | 9/1952 | Hunter . |
| 2,635,527 | 4/1953 | Overbeck et al. . |

(List continued on next page.)

FOREIGN PATENT DOCUMENTS

| 2146547 | 9/1986 | United Kingdom . |
| 91/12304 | 2/1991 | WIPO . |
| 92/22236 | 6/1992 | WIPO . |

OTHER PUBLICATIONS

"New! Permafil Oil Filters"; Filtration International, Inc., Houston, Texas; date unknown.
"Permafil" Brochure; Edible Oil Division, Houston, Texas; date unknown.
Re Nu Brochure, Re Nu Vacuum Filter Manufacturing Company; date unknown.
R.F. Hunter, Co., Inc. Brochure; date unknown.
Robot Coupe USA, Inc. Brochure; date unknown.
Castle Filter Brochure, The Prince Castle Co.; date unknown.

(List continued on next page.)

Primary Examiner—Timothy F. Simone
Attorney, Agent, or Firm—Keeling Law Firm

[57] ABSTRACT

My invention is a portable filtration and treatment apparatus, comprising a tank, a filtering mechanism immersed in the tank (holding cooking oil), a treating mechanism preferably situated external to the tank, a pump, and a discharge. The pump draws liquid (cooking oil) from the tank through the filtering mechanism, through the treating mechanism, and back into the tank or into a cooking fryer by way of the discharge. The tank includes a moving device which allows for the portability of the apparatus. The filtering mechanism comprises a wire mesh envelope, including at least one wire mesh filter screen for filtering the cooking oil, an insert disposed within the wire mesh envelope supporting the wire mesh envelope and providing fluid communication therethrough, and a frame which holds the wire mesh envelope and the insert together. The treating mechanism is a container and is provided with an inlet and an outlet, a selectively removably attached top, and a flow baffle. The container top is sealingly attached to the container in order to effectuate a vacuum within the container upon the activation of the pump. Treating material is disposed in pouches within the treating mechanism. Cooking oil is pumped through the treating mechanism thereby contacting the treating material disposed within the treating mechanism. Treating material comprises any material, such as activated carbon, which upon contact with the cooking oil can extend the usable life of the cooking oil.

15 Claims, 5 Drawing Sheets

U.S. PATENT DOCUMENTS

| | | |
|---|---|---|
| 2,760,641 | 8/1956 | Mies, Jr. et al. . |
| 3,147,220 | 9/1964 | Avery . |
| 3,159,095 | 12/1964 | Wagner . |
| 3,263,818 | 8/1966 | Gedrich . |
| 3,279,605 | 10/1966 | Shepherd . |
| 3,667,374 | 6/1972 | Holmes . |
| 3,735,871 | 5/1973 | Bisko . |
| 4,113,623 | 9/1978 | Koether et al. . |
| 4,328,097 | 5/1982 | Whaley et al. . |
| 4,591,434 | 5/1986 | Prudhomme . |
| 4,604,203 | 8/1986 | Kyle . |
| 4,666,594 | 5/1987 | Schneider . |
| 4,804,466 | 2/1989 | Cooper et al. . |
| 4,805,525 | 2/1989 | Bivens . |
| 4,828,694 | 5/1989 | Leason . |
| 4,945,893 | 8/1990 | Manchester . |
| 4,968,518 | 11/1990 | Lopez . |
| 4,988,440 | 1/1991 | Bernard et al. . |
| 5,049,274 | 9/1991 | Leason et al. . |
| 5,068,115 | 11/1991 | Liebermann . |
| 5,075,000 | 12/1991 | Bernard et al. . |
| 5,143,604 | 9/1992 | Bernard et al. . |
| 5,247,876 | 9/1993 | Wilson et al. . |
| 5,348,755 | 9/1994 | Roy . |
| 5,354,455 | 10/1994 | Burklund et al. . |
| 5,404,799 | 4/1995 | Bivens . |
| 5,458,772 | 10/1995 | Eskes et al. . |
| 5,486,370 | 1/1996 | Bivens . |
| 5,731,024 | 3/1998 | Bivens ................................. 426/417 |

OTHER PUBLICATIONS

Fastfilter Assembly and Operating Instructions; date unknown.

Custom Built–In Micro–Flo Oil Filtration, Dean/Alco; Nov. 1984.

The Filter Magic System by Frymaster Wellbilt Co. Bulletin No. 818–001 Rev/ Nov. 1986; date unknown.

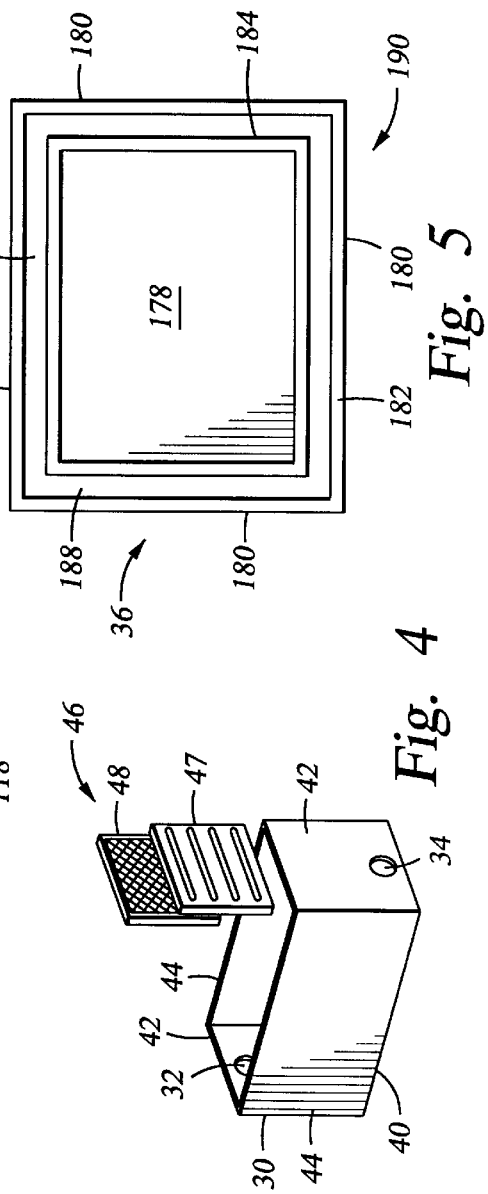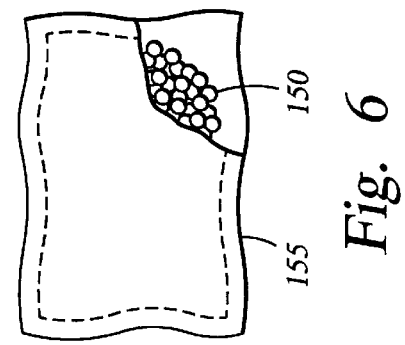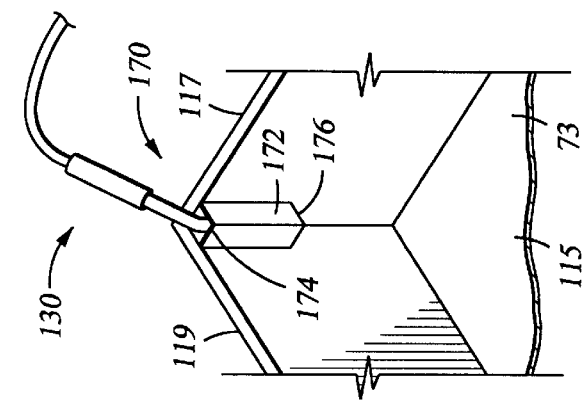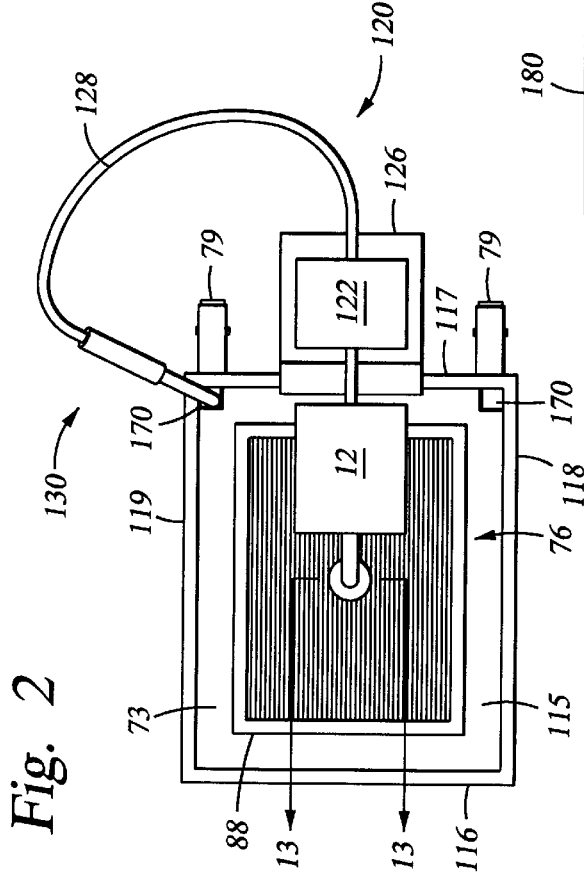

PORTABLE FILTRATION AND TREATMENT APPARATUS

This application is a continuation in part of U.S. patent application Ser. No. 08/784,371, filed by Bivens on Jan. 17, 1997 now U.S. Pat. No. 5,731,024.

BACKGROUND OF THE INVENTION

1. Field of Invention

The present invention relates generally to devices and systems capable of filtering and treating liquids. More specifically, the present invention relates to such devices and systems which are portable and which independently filter and treat cooking oil in fryers after the cooking process is interrupted.

Fryers are extensively used in the food industry to cook various comestibles. A common type of fryer includes a relatively deep container with the comestible to be cooked immersed in cooking oil in the container. The food industry utilizes substantial quantities of cooking oil in cooking fryers. Extending the usable life of cooking oil would substantially reduce the amount of money spent by the food industry on oil and would thus provide the industry a substantial economic benefit.

However, the cooking and heating processes continually alter and degrade the physical and chemical properties of cooking oil thereby reducing the useful life of the oil. Examples of contributors to the alteration and degradation of the cooking oil are food particles that become dislodged from the food during the cooking process and thereafter remain in the oil, water and fats that are extracted from the food during the cooking process and also remain in the oil thereafter, and free fatty acids that form when heat, water, and oxygen act upon and chemically alter the cooking oil and the comestibles (collectively referred to as "the contributors").

Food particles, if not removed from the cooking oil, will eventually become charred and will impart unwanted tastes, odors, and dark color to the oil. Free fatty acids contribute to the degradation of the cooking oil in that as the percentage of free fatty acids in the cooking oil increases, the smoke, flash, and fire points of the cooking oil are reduced. A large reduction in the smoke, flash, and fire points of the cooking oil may result in a fire hazard and/or may cause excessive smoke emissions. The presence of any of these contributors may, by itself, be cause to replace degraded, used oil with new oil.

In order to prolong the usable life of cooking oil, it is thus productive to neutralize and limit the presence and effects of the contributors by filtering the oil to remove the charred food particles and treating the oil to neutralize some of the chemical alterations generated by the contributors.

2. Related Art

In prior art systems, cooking oil is cleaned by pumping it through a filter assembly often containing filter paper or other disposable filter media. A filter powder is normally applied to the filter media by dispersal in the cooking oil. Filter powders commonly consist of diatomaceous earth, perlite or magnesium silicate. In the filtration process, filter powders form a coating on the surface of filter media and thereby mechanically strain suspended solids from liquids.

Such prior art filter powders may also include blends which treat the cooking oil upon contact. However, in order for the blends in the filter powder to sufficiently treat the cooking oil, a specific amount of filter powder and blend (per volume of cooking oil) must be introduced into the cooking oil. If an operator introduces an incorrect amount of filter powder and blend into the cooking oil, then the cooking oil will not be treated adequately.

Thus, the success of cooking oil treatment by such prior art methods depends at least in part on the measuring accuracy of the operator who introduces the filter powder into the cooking oil. It would therefore be a benefit to the industry to design an apparatus which provides adequate treatment of cooking oil in every instance by removing the potential of an operator measuring error. It would also be a benefit to the industry to design such an apparatus so that it is portable from one fryer to another.

In addition, in the majority of prior art systems, filtration takes place only after the cooking process is interrupted. This type of filtration is commonly known in the art as "intermittent" or "batch" filtration and is distinguished from continuous filtration which takes place while the cooking process is actuated. Generally, continuous filtration requires a specially designed fryer and filtration system. On the other hand, batch/intermittent filtration systems are normally capable of filtering the cooking oil in most fryers. It would thus be a benefit to the industry to design an apparatus as heretofore described which is capable of filtering the cooking oil in most fryers by batch/intermittent filtration.

This Applicant's U.S. Pat. No. 5,595,107 discloses a filtering and treating device including an external wire mesh filter screen, an inner, rigid, support or insert, and a centrally-disposed spool, the spool including fluid channels connectable to a suction pump. The shell and the interior walls define compartments to retain treating materials, such as activated carbon, which extend the usable life of the cooking oil. The suction pump draws liquid from outside the wire mesh envelope, through the support/insert, through the compartments and treating material and, through the central spool. Thus, the claimed device is capable of continuously and concurrently filtering and treating cooking oil during the cooking operation without the need for filter powders. However, the claimed devices are not portable and may not be used as a batch or intermittent filtration system capable of filtering the cooking oil in most existing fryers.

This Applicant's co-pending U.S. patent application Ser. No. 08/784,371, now U.S. Pat. No. 5,731,024 discloses a continuous and concurrent closed filtering and treating device, comprising a filtering mechanism immersed in a tank of liquid (fryer), a treating mechanism situated external to said tank, and a suction pump which draws liquid (cooking oil) from the reservoir through the filtering mechanism, through the treating mechanism, and pumps it back into the tank. The treating mechanism is a vessel in one embodiment and a container in another embodiment and is provided with an inlet and an outlet and a selectively removably attached top. Treating material is disposed within the treating mechanism. Cooking oil is pumped through the treating mechanism thereby contacting the treating material disposed within the treating mechanism. Treating material comprises any material, such as activated carbon, which upon contact with the cooking oil can extend the usable life of the cooking oil. Although the device eliminates the use of filter powders, the claimed device is not portable and cannot be used as a batch or intermittent filtration system capable of filtering the cooking oil in most fryers.

The prior art does not disclose a portable device which provides filtration and treatment of the cooking oil, eliminates the need for filter powder, and can be used as a batch or intermittent filtration system capable of filtering the cooking oil in most fryers.

SUMMARY OF THE INVENTION

It is an object of the present invention to provide a portable batch or intermittent filtration device and system also capable of independent treatment of the cooking oil.

It is another object of the present invention to provide a portable batch or intermittent filtration device and system also capable of independent treatment of the cooking oil in which the amount, effectiveness, efficiency and performance of the treating material is not limited by the dimensions of the fryer container cavity.

It is another object of the present invention to provide a portable batch or intermittent filtration device and system also capable of independent treatment of the cooking oil in which the filtering operation occurs independently and in series with the treating operation.

It is another object of the present invention to provide a portable batch or intermittent filtration device and system also capable of independent treatment of the cooking oil in which the filtering operation may occur without the need for filter powders.

These and other objects of the present invention will become apparent from a reading of the attached specification and appended claims.

To achieve such improvements, my invention is a portable filtration and treatment apparatus, comprising a tank, a filtering mechanism immersed in the tank (holding cooking oil), a treating mechanism preferably situated external to the tank, a pump means, and a discharge means. Pump means draws liquid (cooking oil) from the tank through the filtering mechanism, through the treating mechanism, and back into the tank or into a cooking fryer through the discharge means. The tank includes moving means which allows for the portability of the apparatus. The filtering mechanism comprises a wire mesh envelope, including at least one wire mesh filter screen for filtering the cooking oil, an insert disposed within the wire mesh envelope supporting the wire mesh envelope and providing fluid communication therethrough, and a frame which holds the wire mesh envelope and the insert together. The treating mechanism is a container and is provided with an inlet and an outlet, a selectively removably attached top, and a flow baffle means. The container top is sealingly attached to the container in order to effectuate a vacuum within the container upon the activation of pump means. Treating material is disposed in pouches within the treating mechanism. Cooking oil is pumped through the treating mechanism thereby contacting the treating material disposed within the treating mechanism. Treating material comprises any material, such as activated carbon, which upon contact with the cooking oil can extend the usable life of the cooking oil.

BRIEF DESCRIPTION OF THE DRAWINGS

FIG. 2 is a top view of the portable filtration and treatment apparatus in the recirculation mode.

FIG. 3 is a partial isometric view of the tank, including discharge inlet.

FIG. 4 is an isometric view of the treating mechanism without a top and with the baffle means exploded from the view.

FIG. 5 is a top view of the container top lower surface.

FIG. 6 is a top view of the pouches with treating material therein.

DETAILED DESCRIPTION OF THE INVENTION

Figure 1:
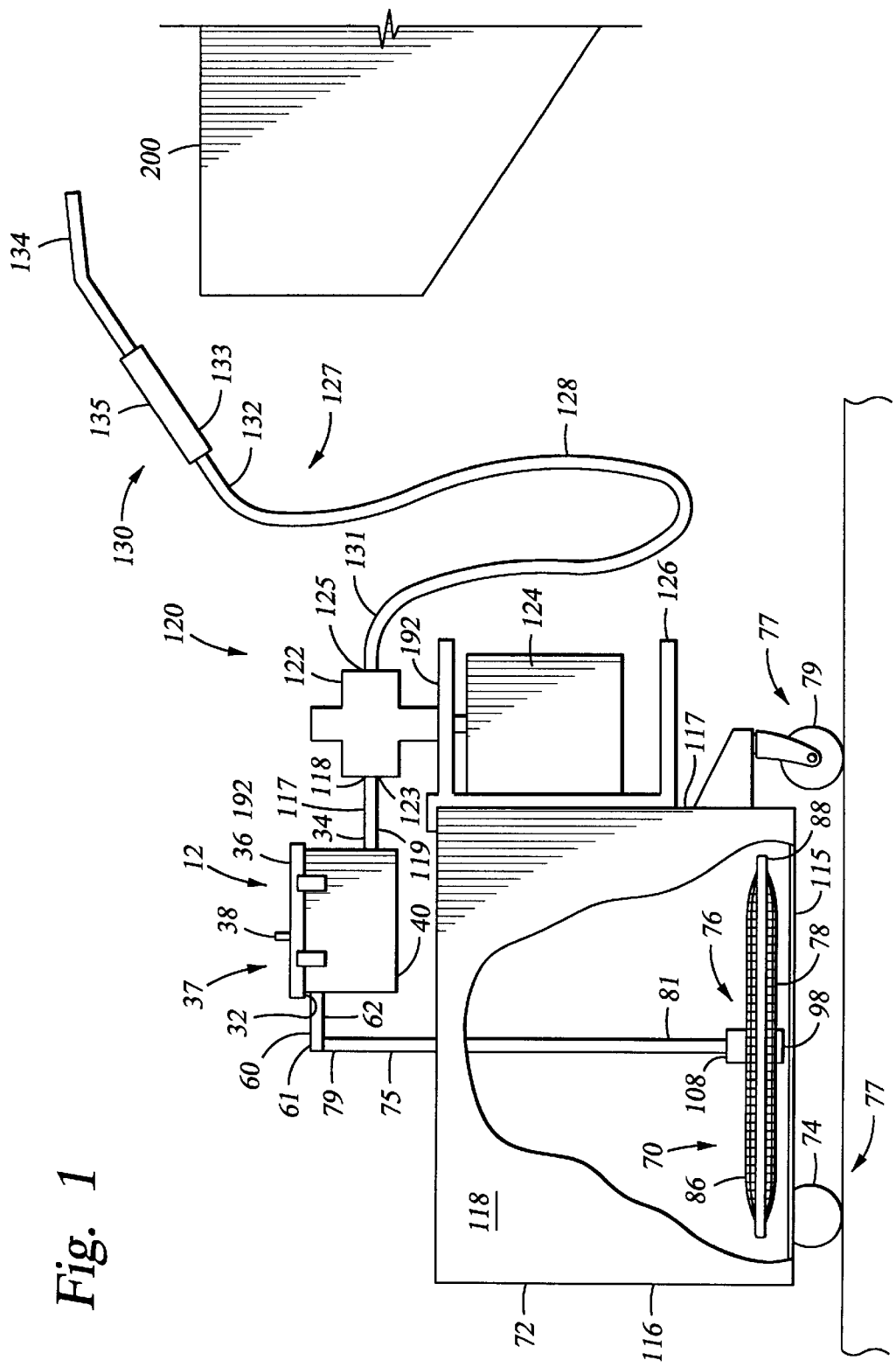
FIG. 1 is a side view of the portable filtration and treatment apparatus in the return mode.

Referring to FIGS. 1–13, there is shown at 10 the Portable Filtration and Treatment Apparatus of the present invention. The principal components of the apparatus 10 comprise a tank 72, a filtering mechanism 70, a treating mechanism 12, a pump means 120, and a discharge means 127.

Tank 72 is suitable for receiving cooking oil therein. Tank 72 includes a tank bottom 115 and tank side walls 116, 117, 118, and 119. Tank side walls 116, 117, 118, and 119 extend upwardly from the tank bottom 115. The tank side walls 116, 117, 118, and 119 are arranged so as to define tank interior 73 for the containment of cooking oil therein.

In an alternative embodiment (not shown in Figures), tank 72 includes a tank top. Tank top is removably attached to tank 72. Tank top includes a tank top opening for reception of suction pipe 75 therethrough.

Tank 72 also includes moving means 77 providing mobility to tank 72 so as to provide portability to the apparatus 10. In a preferred embodiment, moving means 77 comprises two tank stationary casters 74 and two tank swivel casters 79. The two tank stationary casters 74 are attached to two adjacent corners of tank bottom 115. The two tank swivel casters 79 are attached to the remaining two corners of tank bottom 115. Casters 74 and 79 provide mobility to tank 72.

Referring to FIGS. 2 and 3, tank 72 also includes at least one discharge inlet 170 positioned within the tank interior 73. At least one discharge inlet 170 provides fluid communication between tank interior 73 and the exterior of the tank 72. In a preferred embodiment, at least one discharge inlet 170 comprises square tubing 172 attached to a junction of two of the tank side walls, 116, 117, 118, and 119. Tubing 172 includes a tubing first end 174 and a tubing second end 176. Tubing first end 174 is substantially adjacent the upper end of tank side walls, 116, 117, 118, and 119. Tubing 172 extends downward towards tank bottom 115 so that tubing second end 176 is in fluid communication with tank interior 73.

Filtering mechanism 70 generally comprises a filter insert 94, a wire mesh envelope 76, a first cap 98, and a second cap 108.

Figure 7:
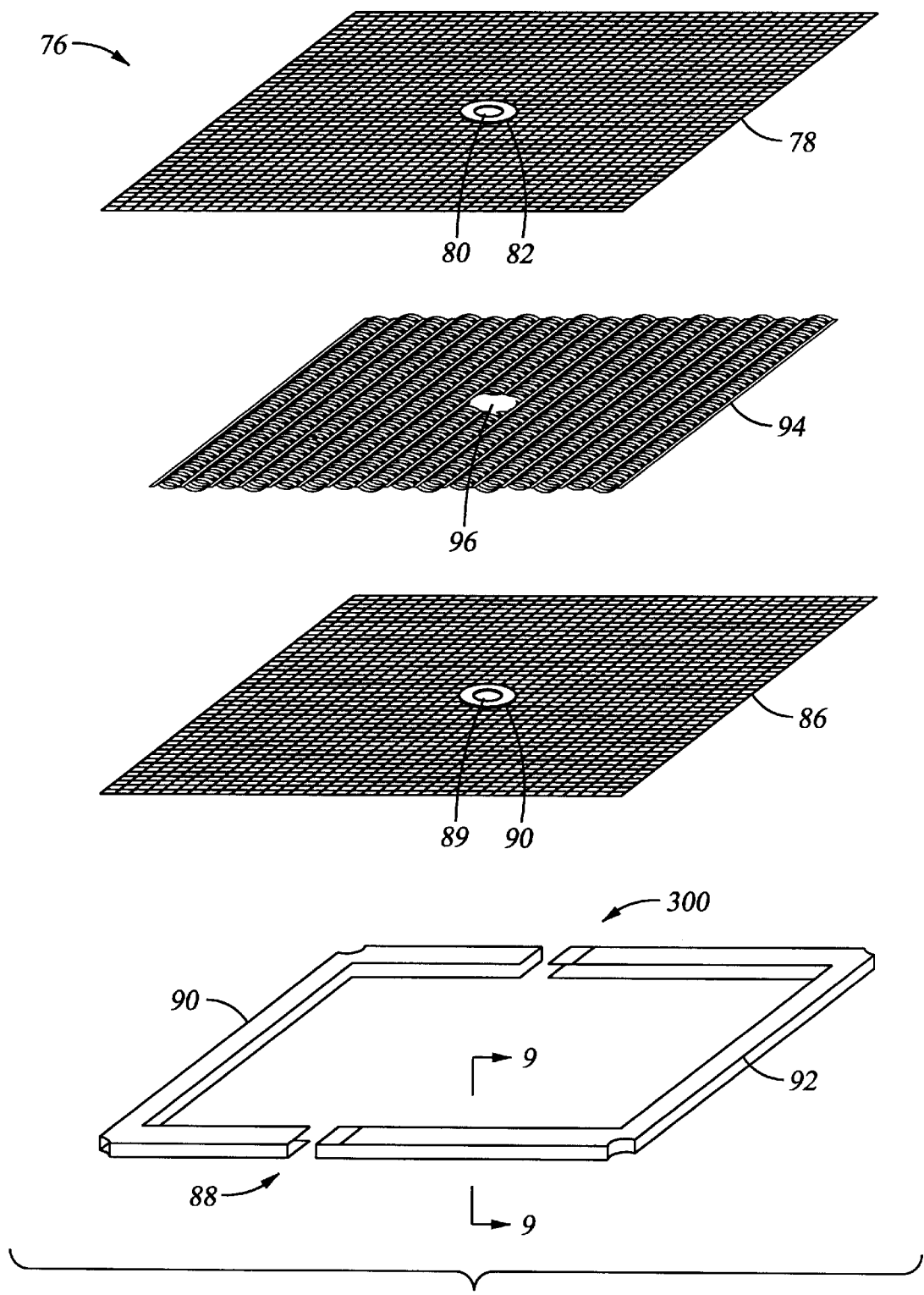
FIG. 7 is an exploded isometric view of the wire mesh envelope with one embodiment of the frame.

As best seen in FIG. 7, filter insert 94 is generally rectangular in shape and contains sufficient voids to allow the free flow of fluids therethrough, both vertically and laterally. A metallic plate having a tubular slit grid has been proven to be a material which is suitably rigid at temperatures incurred in cooking oil applications. The tubular slit grid is formed generally by providing parallel slits in the metallic plate and deforming the area between the slits to provide alternately raised and lowered sections of material. The tubular slit grid provides passageways for a vertical and lateral fluid travel. Filter insert 94 also includes a central opening 96 in its center.

The dimensions of filter insert 94 are sized and manufactured to allow filter insert 94 to be inserted into wire mesh envelope 76. Wire mesh envelope 76 includes a first rectangular wire mesh filter screen 78, a second rectangular wire mesh filter screen 86, and a frame 88. The first filter screen 78 and the second filter screen 86 are substantially the same length and width. Filter insert 94 supports and maintains separation between filter screens 78 and 86.

Figure 9:
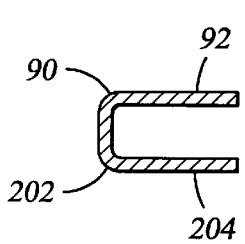
FIG. 9 is a cross-sectional view along line 9—9 of FIGS. 7 and 8.

Frame 88 includes two embodiments. In the first embodiment of frame 88 as shown in FIG. 7, frame 88 comprises two c-shaped sections, first frame section 90 and second frame section 92. Frame sections 90 and 92 have a generally unshaped cross-section. The channel defined by the unshaped cross-section of frame sections 90 and 92 (as shown in FIG. 9) is sized to receive the ends of filter insert 94 and filter screens 78 and 86. To assemble wire mesh envelope 76, filter insert 94 is placed between filter screens 78 and 86 and, as a unit, filter insert 94 and filter screens 78 and 86 are inserted in the u-shape cross-section of first frame section 90. After the unit is completely inserted within first frame section 90 and is securely held together therein, second frame section 92 is inserted on the end of the unit distal first frame section 90 and is pushed towards first frame section 90. Frame sections 90 and 92 also include an attachment means 300, such as a press-fit interlocking arrangement, providing attachment to each other thereby securely holding the unit therein. After second frame section 92 completely surrounds the unit, frame sections 90 and 92 lock together by way of the attachment means forming a rectangular frame and completing the assembly of wire mesh envelope 76. Thus, the filter insert 94 and filter screens 78 and 86 are secured by frame sections 90 and 92.

Figure 8:
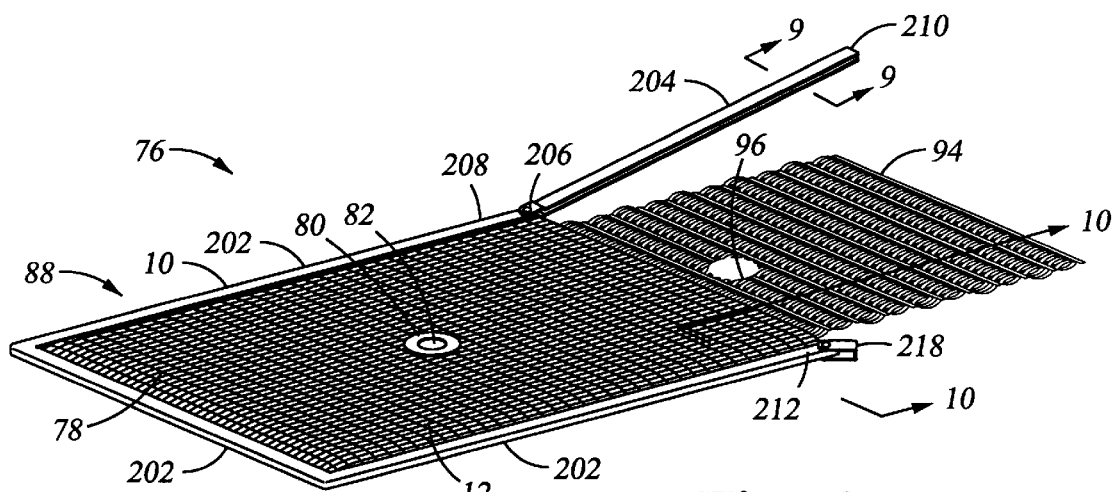
FIG. 8 is an isometric view of the wire mesh envelope with a second embodiment of the frame and with insert partially therein.
Figure 10:
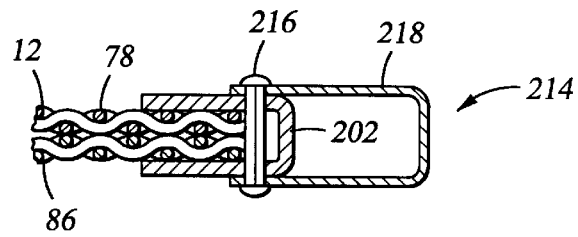
FIG. 10 is a cross-sectional view along line 10—10 of FIG. 8.
Figure 11:
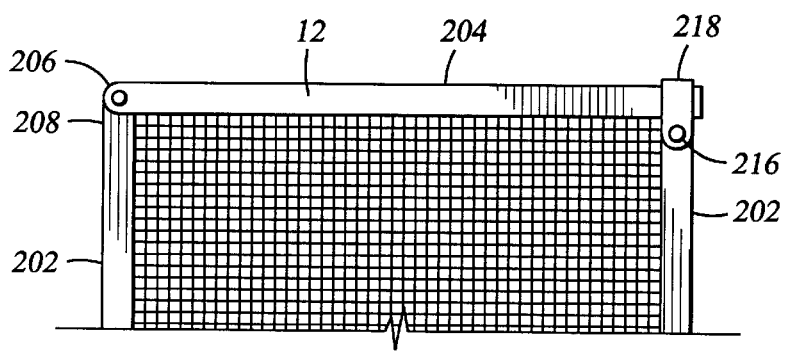
FIG. 11 is a view of an end of the wire mesh envelope with the second embodiment of the frame.

In the second embodiment of frame 88 as shown in FIGS. 8, 10, and 11, frame 88 comprises a channel 202 which extends around three peripheral edges of filter screens 78 and 86, the peripheral edges extending into the channel 202. In the preferred embodiment, the peripheral edges of filter screens 78 and 86 are fixedly attached in channel 202 by welding.

A channel 204 is rotatably attached at a channel first end 206 to an end 208 of channel 202. A second, distal end 210 of channel 204 is releasably connectable to a second end 212 of channel 202. Upon complete insertion of the filter insert 94 within wire mesh envelope 76, channel 204 is rotatable to a closed position with end 210 adjacent end 212.

Referring to FIG. 9, a cross-sectional view of channel 204 is depicted, the channel 204 comprising a generally unshaped member. The cross-sectional view of channel 204 is typical of channel 202.

Referring to FIG. 10, a connector 214 is depicted at line 10—10 of FIG. 8, connector 214 comprising a generally u-shaped band 218 rotatably connected by rod 216 to channel 202. Rod 216 extends through end 212 of channel 202. Upon rotation of channel 204 to the closed position with end 210 adjacent end 212, band 218 may be rotated about rod 216 to a position exterior of end 210 of channel 204, thereby retaining channel 204 in the closed position.

Referring to FIG. 11, a section of the wire mesh envelope 76 is depicted with channel 204 in the closed position and with the band 218 rotated exterior of end 210 of channel 204 thereby securing filter insert 94 and filter screens 78 and 86.

An aperture 80 is located centrally of filter screen 78. A like aperture 89 is located centrally of filter screen 86. Upon construction of wire mesh envelope 76, the central opening 96 of filter insert 94 is aligned with the apertures 80 and 89.

A washer 82 is juxtaposed against the exterior of filter screen 78. A like washer 90 is juxtaposed against the exterior of filter screen 86. Upon construction of wire mesh envelope 76, the annular openings of washers 82 and 90 are located centrally of filter screens 78 and 86 respectively, and are aligned with apertures 80 and 89 respectively.

Figure 12:
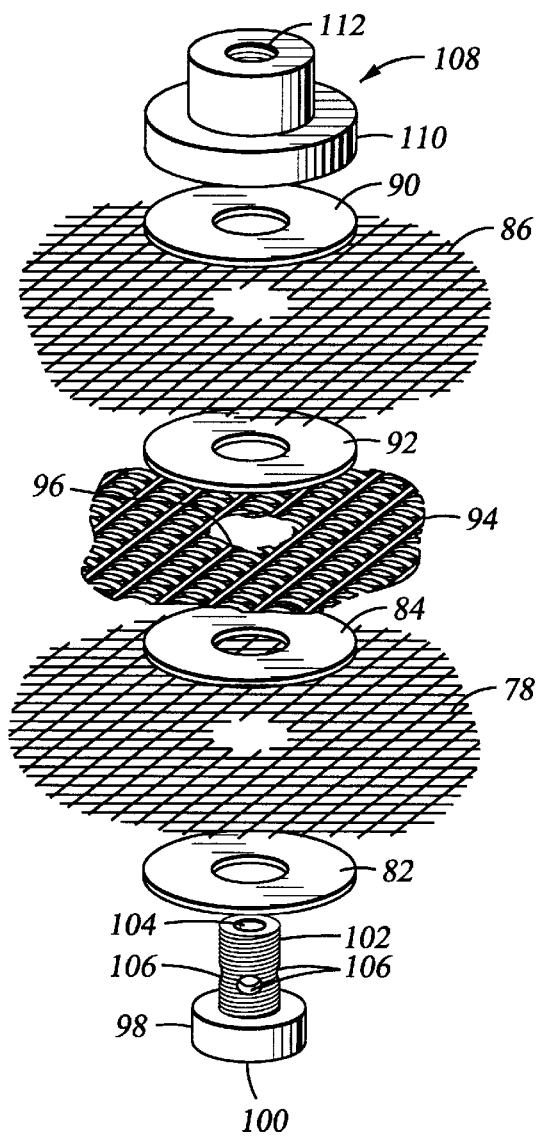
FIG. 12 is an exploded isometric view of the central portion of the wire mesh envelope, including washer members.

Details of the assembly of the central portion of the wire mesh envelope 76 together with filter insert 94 are depicted in an exploded isometric view, FIG. 12, including a first cap 98, a second cap 108, washers 82 and 90, filter screens 78 and 86, washer members 84 and 92, and filter insert 94.

Second cap 108 includes a generally flat lip 110 at one end. Second cap 108 is connected to a suction pipe 75 and also includes an internally-threaded axial passageway 112 therethrough which is in fluid communication with suction pipe 75. Such connection between second cap 108 and suction pipe 75 may be a permanent connection such as by welding or a releasable connection such as by threading (as shown in FIG. 7) to allow removal of second cap 108 as desired.

First cap 98 includes a head portion 100 and a threaded body portion 102. Threaded body portion 102 has an interior passageway 104 drilled therein which is in fluid communication with axial passageway 112 of second cap 108 and suction pipe 75. The interior threads of second cap 108 engage the male external threads on the body portion 102 of first cap 98. A plurality of ports 106 extend radially through the body portion 102. Ports 106 are in fluid communication with interior passageway 104. And, in the assembled configuration, ports 106 are in fluid communication with the area surrounding filter insert 94 and interior to wire mesh envelope 76 such that any suction applied to interior passageway 104 will cause cooking oil to pass through filter insert 94, through radial ports 106, through interior passageway 104, and into and through suction pipe 75.

In its assembled configuration, washer 90 is juxtaposed between lip 110 of second cap 108 and second filter screen 86. In its assembled configuration, washer 82 is juxtaposed between first filter screen 78 and the head portion 100 of first cap 98.

Figure 13:
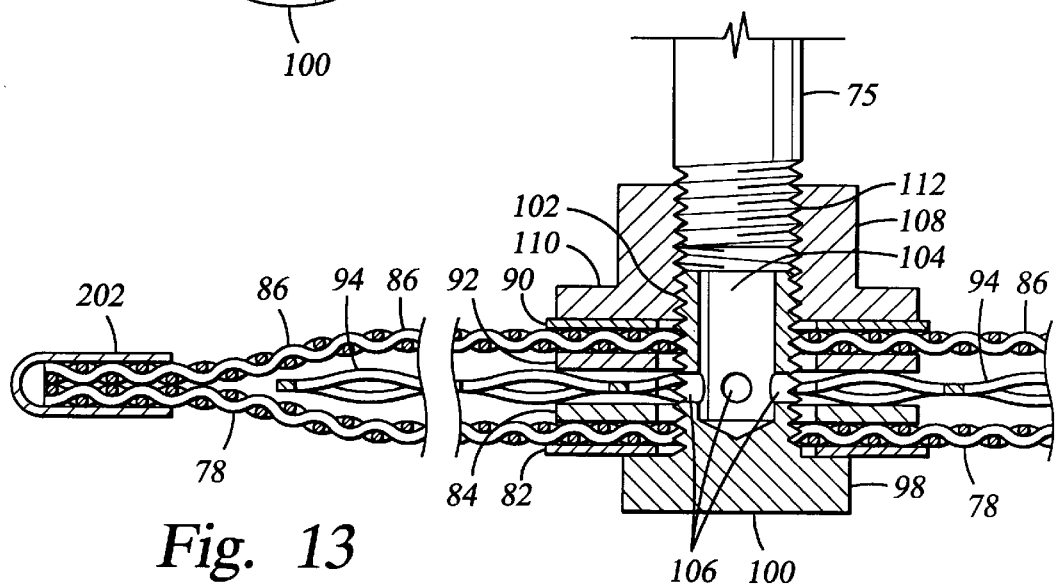
FIG. 13 is a cross-sectional view along line 13—13 of FIG. 2.

Washer member 84 is interposed between filter insert 94 and first filter screen 78. Similarly, washer member 92 is interposed between filter insert 94 and second filter screen 86. Washer members 84 and 92 provide suitable separation between filter insert 94 and filter screens 78 and 86. The central opening 96 of filter insert 94 and the annular openings of washer members 84 and 92 accommodate body portion 102 of the first cap 98. As shown in FIG. 13, as the first cap 98 is tightened within the threads of the second cap 108, the elements of the apparatus 10 are drawn together in a sandwiched configuration. Those elements, as embodied in FIGS. 12 and 13, include first cap 98, washer member 82, filter screen 78, washer 84, filter insert 94, washer 90, filter screen 86, washer member 92, and second cap 108.

Preferably, wire mesh envelope 76, together with first and second caps 98 and 108, is positioned within tank 72 near tank bottom 115 so that filter screens 78 and 86 are parallel to tank bottom 115 and so that first cap 98 is proximal tank bottom 115 and second cap 108 is distal tank bottom 115.

Suction pipe 75 has two ends, first end 81 and second end 79. At suction pipe first end 81, suction pipe 75 is connected to (by any conventional means such as threading or welding)

and is in fluid communication with second cap 108. Preferably, suction pipe 75 extends vertically upwards from first and second caps 98 and 108 so that suction pipe second end 79 is located external to tank 72.

Treating mechanism 12 comprises an enclosed container 30. Treating mechanism 12 is preferably located external to tank 72 and is in fluid communication with suction pipe 75 by way of pipe 60. Treating mechanism 12 is also preferably situated above the level of the cooking oil in tank 72.

In the embodiment shown in the Figures, container 30 is generally rectangular in shape. However, it is understood that container 30 may comprise any shape. As best shown in FIGS. 1, 4, and 5, container 30 includes a container inlet 32, a container outlet 34, a container top 36, a container bottom 40, a first pair of opposing container walls 42, and a second pair of opposing container walls 44.

Preferably, container inlet 32 and container outlet 34 are located on opposing sides of container 30. In a preferred embodiment, container inlet 32 is located on one of the container walls, 42 or 44. adjacent container top 36 and container outlet 34 is located on the opposing container wall, 42 or 44, adjacent container bottom 40. In an alternative embodiment (not shown in the Figures), container inlet 32 is located on one of the container walls, 42 or 44, adjacent container bottom 40 and container outlet 34 is located on the opposing container wall, 42 or 44, adjacent container top 36. In either embodiment, it is preferred that container 30 be positioned so that container bottom 40 is generally parallel to the ground (not shown).

Turning to FIG. 4, container 30 also includes container flow baffle means 46 which allows and directs the flow of cooking oil therethrough. Container flow baffle means 46 is located internal to container 30 and borders the container wall, 42 or 44, which includes container outlet 34.

In a preferred embodiment, container flow baffle means 46 comprises a baffle plate 47 and a baffle screen 48. Baffle plate 47 preferably comprises a metallic plate having a tubular slit grid thereby allowing the flow of cooking oil therethrough. Baffle screen 48 preferably comprises a wire mesh screen which also allows the flow of cooking oil therethrough.

Preferably, baffle plate 47 directly abuts the container wall, 42 or 44, which includes container outlet 34 so that baffle plate 47 covers container outlet 34. Baffle screen 48 preferably abuts baffle plate 47 so that baffle plate 47 is located intermediate baffle screen 48 and the container wall, 42 or 44, which includes container outlet 34.

As shown in FIG. 1, container top 36 is removably, sealingly attached to container 30 at the upper end of walls, 42 and 44, by way of container top attachment means 37. In a preferred embodiment, container top attachment means 37 comprises quick release latches together with a sealing means 190. Sealing means 190 seals the interior of container 30 from the atmosphere by sealing the junction between container 30 and the upper end of walls, 42 and 44.

Turning to FIG. 5, container top 36 includes a container top lower surface 178 and container top outer edges 180. Container top lower surface 178 includes a first lip 182 and a second lip 184. First and second lips, 182 and 184, each protrudes outwardly from container top lower surface 178 and each outlines and mirrors the general shape of container top 36. In the preferred embodiment, first and second lips, 182 and 184, each protrudes outwardly from container top lower surface 178 in a direction normal to container top lower surface 178. Preferably, first lip 182 extends from container top outer edges 180 along the entire perimeter of container top lower surface 178. Second lip 184 is parallel to and mirrors the shape of first lip 182 and is located a distance 186 away from first lip 182 within the perimeter formed by first lip 182.

First lip 182, second lip 184, and distance 186 form a channel 188. Sealing means 190 is positioned within channel 188. Preferably, sealing means 190 comprises a rubber gasket capable of withstanding high temperatures, such as viton seal.

Channel 188 is constructed and located so that when container top attachment means 37 attaches container top 36 to container 30, the upper ends of walls, 42 and 44, are positioned within channel 188 and securely abut sealing means 190. With the pressure provided by the container top attachment means 37 (the quickrelease latches in the preferred embodiment), sealing means 190 thereby seals the interior of container 30 from the atmosphere and the exterior of container 30.

Container top 36 also normally includes a container accessory connection 38. Container accessory connection 38 may provide connection, by any conventional means such as threading, to a vacuum gauge (not shown). The vacuum gauge is conventional and well-known in the art. The vacuum gauge measures the vacuum pressure within the treating mechanism 12.

The interior of treating mechanism 12 (container 30) accommodates pouches 155 which contain treating material 150. Pouches 155, in the preferred embodiment and as shown in FIG. 6, are constructed of a woven material permeable to liquids. Pouches 155 are closed around their perimeter and contain treating material 150 for treatment of liquids flowing through pouches 155. The treating material 150 may comprise any material capable, upon contact with the cooking oil, of enhancing the performance attributes and properties of the cooking oil, such as activated carbon.

Pipe 60 provides fluid communication between suction pipe 75 and treating mechanism 12. Pipe 60 includes two ends, first end 61 and second end 62. Pipe first end 61 is connected to, by any conventional means such as threading, and is in fluid communication with suction pipe second end 79. Pipe second end 62 is connected to, by any conventional mean such as threading, and is in fluid communication with container inlet 32. Such connection between pipe second end 62 and container inlet 32 is preferably a releasable connection such as a commercially available quickrelease connecting device for piping or hoses to allow removal of container 30.

Pump means 120 comprises a pump 122, a motor 124, and a pump/motor attachment means 126.

Pump 122 comprises a suction pump and may comprise any such pump capable of providing enough suction pressure to pump the cooking oil through apparatus 10. Pump 122 includes a pump inlet 123 and a pump outlet 125.

Pipe 119 provides fluid communication between treating mechanism 12 and pump 122. Pipe 119 includes two ends, first end 117 and second end 118. Pipe first end 117 is connected to, by any conventional means such as threading, and is in fluid communication with container outlet 34. Such connection between pipe first end 117 and container outlet 34 is preferably a releasable connection such as a commercially available quick-release connecting device for piping or hoses to allow removal of container 30. Pipe second end 118 is connected to, by any conventional means such as threading, and is in fluid communication with pump inlet 123.

Motor 124 drives pump 122, and as such comprises any motor capable of powering pump 122.

Pump/Motor attachment means 126 attaches and supports the pump 122 and the motor 124 to the tank 72. In the preferred embodiment, pump/motor attachment means 126 comprises a c-shaped plate 192 which is connected to tank 72 by any common means, such as hooks or fasteners, and which supports pump 122 and motor 124 thereon.

Discharge means 127 comprises a hose 128 and a handle 130. Hose 128 is constructed of a common flexible material capable of withstanding high temperatures and has two ends, first end 131 and second end 132. Hose first end 131 is connected to, by any conventional means, and is in fluid communication with pump outlet 125. Such connection between hose first end 131 and pump outlet 125 is preferably a releasable connection such as a commercially available quick-release connecting device for piping or hoses to allow removal of hose 128. Hose second end 132 is connected to, by any conventional means, and is in fluid communication with handle 130. Such connection between hose second end 132 and handle 130 is preferably a releasable connection such as a commercially available quick-release connecting device for piping or hoses to allow removal of handle 130.

Handle 130 includes an inlet end 133 and a discharge end 134. Inlet end 133 is connected to (as previously disclosed) and is in fluid communication with hose second end 132. Handle 130 also includes a grip 135 by which a user may grasp handle 130. Handle 130 and handle discharge end 134 are sized and shaped so that handle discharge end 134 may be inserted and securely held within tubing 172 when apparatus 10 is in operation.

In operation, in order for the cooking oil of a fryer 200 to be filtered and treated by the apparatus 10, the fryer 200 must first be deactivated. Once fryer 200 is deactivated, apparatus 10 is moved, by way of casters, 74 and 79, to a position underneath the outlet port or valve of fryer 200. After tank 72 is positioned underneath the outlet port or valve of fryer 200, the outlet port or valve of fryer 200 is opened, and cooking oil flows from the fryer 200 through the outlet port and into tank 72.

The cooking oil is first continuously circulated within apparatus 10 for a specified period of time (referred to as the "recirculation mode"). However, prior to the beginning of the recirculation mode, the user must securely place handle 130 within tubing 172 so that handle 130 remains within tubing 172 as cooking oil circulates through apparatus 10 and so that cooking oil flowing out from the discharge end 134 of handle 130 falls into tank 72. The recirculation mode is depicted in FIGS. 2 and 3.

Once handle 130 is properly secured within tubing 172, the motor 124 and pump 122 are powered. Upon activation of pump 122, the cooking oil in tank 72 is pumped through filtering mechanism 70, through treating mechanism 12, and back into tank 72 by way of discharge means 127.

Once the recirculation mode has been run for the appropriate period of time, the motor 124 and pump 122 are deactivated. The cooking oil is ready to be returned into tank 72 (referred to as the "return mode"). To do so, the user must remove handle 130 from tubing 172 and place the discharge end 134 of handle 130 within fryer 200 so that cooking oil flowing out from handle 130 falls into fryer 200. Once handle 130 is positioned within tank 72, the motor 124 and pump 122 are again activated. Upon activation of pump 122, the cooking oil in tank 72 is pumped through filtering mechanism 70, through treating mechanism 12, and into fryer 200 by way of discharge means 127. The return mode is depicted in FIG. 1.

More specifically, in both the recirculation mode and in the return mode, upon activation of pump 122, a suction is created in interior passageway 104 of first cap 98 drawing cooking oil from within the tank interior 73 through wire mesh envelope 76, through filter insert 94, through ports 106, through first cap interior passageway 104, and into second cap interior passageway 112. Pump 122 draws the cooking oil from interior passageway 104 through suction pipe 75, through pipe 60, through treating mechanism 12, through pipe 119, and out of pump outlet 125, hose 128, and handle 130. In the recirculation mode, the cooking oil discharged from handle 130 flows into tank 72. In the return mode, the cooking oil discharged from handle 130 flows into fryer 200.

As the cooking oil is drawn from outside filtering mechanism 70 through wire mesh envelope 76, the particulate matter within the cooking oil contained within tank 72 will accumulate on the outside of first and second wire mesh filter screens, 78 and 86. In this way, filtering mechanism 70 filters the cooking oil, removing the particulate matter.

The cooking oil enters treating mechanism 12, after flowing through pipe 60, at container inlet 32. As the oil flows within container 30, the oil is treated when it engages permeable pouches 155 containing treating material 150. Since container inlet 32 is situated near container top 36 and container outlet 34 is situated near container bottom 40 (in the preferred embodiment), container outlet 34 is situated at a level lower than container inlet 32. Thus, before it can exit container 30, the oil must descend and percolate down container 30 and to the level of container outlet 34. In this manner, as it descends within container 30 to the level of container outlet 34, the oil passes through and is treated by the maximum number of pouches 155 and amount of treating material 150 within container 30. Once it reaches the level of container outlet 34, the oil passes through baffle screen 48 and baffle plate 47 and then exits container 30 through container outlet 34 into pipe 119. Container 30 (treating mechanism 12) and treating material 150 thus treat the cooking oil.

It must be understood that pump 122 produces a vacuum within container 30, suctioning the cooking oil within container 30 through container outlet 34. The vacuum effect within container 30 occurs because the interior of container 30 is sealed off from the atmosphere by container top attachment means 37, sealing means 190, and the fact that filtering mechanism 70 is completely immersed in cooking oil.

The vacuum effect within container 30 also tends to draw pouches 155 toward container outlet 34. Baffle means 46, located next to container outlet 34, restricts the movement of pouches 155 and serves to ensure that pouches 155 are not drawn into container outlet 34 thereby preventing pouches 155 from obstructing container outlet 34.

After exiting treating mechanism 12, the cooking oil travels within pipe 119 and into pump 122 at pump inlet 123. Pump 122 provides a positive pressure to the cooking oil and pumps it out of pump outlet 125. Once out of pump outlet 125, the cooking oil flows within hose 128 and into handle 130.

When the apparatus 10 is operated in the recirculation mode, the cooking oil flows out from handle discharge end 134 and back into tank 72. When the apparatus 10 is operated in the return mode, the cooking oil flows out from handle discharge end 134 and into fryer 200.

Functionally applying the above described portable filtration and treatment apparatus 10 provides a method of filtering and treating cooking oil by way of portable means and by batch or intermittent filtration.

The foregoing disclosure and description of the invention is illustrative and explanatory thereof. Various changes in the details of the illustrated construction may be made within the scope of the appended claims without departing from the true spirit of the invention. For instance, it is understood that the scope of this invention includes the treating and filtering of other substances, and not just cooking oil disposed in a fryer. The present invention should only be limited by the following claims and their legal equivalents.

I claim:

1. An apparatus for filtering and treating cooking oil comprising:
   a tank having a bottom and side walls defining a tank interior;
   cooking oil disposed within said tank interior;
   said tank including moving means providing portability to said apparatus;
   a filtering mechanism disposed in said tank;
   said filtering mechanism including at least one wire mesh screen;
   a treating mechanism external of said tank;
   said treating mechanism in fluid communication with said filtering mechanism;
   pump means in fluid communication with said treating mechanism;
   discharge means in fluid communication with said pump means;
   said pump means pumping cooking oil from said tank interior, through said filtering mechanism, through said treating mechanism, and out of said apparatus through said discharge means;
   whereby said cooking oil is filtered and treated by said apparatus.

2. An apparatus as in claim 1 wherein said treating mechanism is situated above the level of said cooking oil in said tank.

3. An apparatus as in claim 2, wherein:
   said treating mechanism containing treating material;
   said treating material contacting said cooking oil as said cooking oil flows through said treating mechanism; and
   whereby said cooking oil is treated by said treating material.

4. An apparatus as in claim 3, wherein:
   said treating mechanism comprising a container;
   said container including a container top and container top attachment means;
   said container top attachment means selectively and removably attaching said container top to said container; and
   said container top attachment means including sealing means for sealing the interior of said container from the atmosphere.

5. An apparatus as in claim 4, wherein:
   said container top including a container top lower surface, container top outer edges, and a perimeter;
   said container top lower surface including a first lip and a second lip;
   said first and second lips protruding outwardly from said container top lower surface;
   said first lip extending outwardly from said container top outer edges along the entirety of said container top perimeter thereby forming a first lip perimeter;
   said second lip located within said first lip perimeter a distance away from said first lip; and
   said second lip parallel to and mirroring the shape of said first lip.

6. An apparatus as in claim 5, wherein:
   said container top further comprising a channel formed by said first lip, said second lip, and said distance;
   said container further comprising container walls;
   said sealing means comprising a gasket;
   said gasket positioned within said channel; and
   said channel constructed and located so that, when container top attachment means attaches said container top to said container, the upper ends of said container walls are positioned within said channel and abut said gasket thereby providing a seal therebetween.

7. An apparatus as in claim 6 wherein said container further comprises a container bottom being generally parallel to the ground.

8. An apparatus as in claim 7 wherein said container further comprises:
   a container inlet in fluid communication with said filtering mechanism;
   a container outlet in fluid communication with said pump means; and
   said container inlet and said container outlet located on opposing sides of said container.

9. An apparatus as in claim 8 wherein said container inlet is adjacent said container top and said container outlet is adjacent said container bottom.

10. An apparatus as in claim 8 wherein said container inlet is adjacent said container bottom and said container outlet is adjacent said container top.

11. An apparatus as in claim 8 wherein said container further comprises
   a container flow baffle means allowing and directing the flow of said cooking oil therethrough;
   said container flow baffle means comprising a baffle plate and a baffle screen;
   said baffle plate selectively removably positioned in said container;
   said baffle plate abutting said container outlet so that said baffle plate covers said container outlet;
   said baffle screen selectively removably positioned in said container; and
   said baffle screen abutting said baffle plate so that said baffle plate is located intermediate said baffle screen and said container outlet.

12. An apparatus as in claim 11 wherein:
   said baffle plate comprising a metallic plate having a tubular slit grid; and
   said baffle screen comprising a wire mesh screen.

13. An apparatus as in claim 12 wherein said tank moving means comprises casters attached to said tank bottom.

14. An apparatus as in claim 13 wherein said tank further comprises:

at least one discharge inlet;

said at least one discharge inlet providing fluid communication between said tank interior and the exterior of said tank; and said at least one discharge inlet positioned within said tank interior.

15. An apparatus as in claim 14 wherein said discharge means comprises:

a hose and a handle;

said hose in fluid communication with said pump means;

said handle in fluid communication with said hose;

said handle including a discharge end; and said handle discharge end sized and shaped to be insertable into and securely held within said at least one discharge inlet.

* * * * *